(12) United States Patent
Miyamatsu et al.

(10) Patent No.: US 8,934,220 B2
(45) Date of Patent: Jan. 13, 2015

(54) ELECTRONIC DEVICE

(75) Inventors: Yuki Miyamatsu, Tokyo (JP); Hiroyuki Satou, Tokyo (JP)

(73) Assignee: Panasonic Corporation, Osaka (JP)

( * ) Notice: Subject to any disclaimer, the term of this patent is extended or adjusted under 35 U.S.C. 154(b) by 344 days.

(21) Appl. No.: 13/579,872

(22) PCT Filed: Sep. 15, 2011

(86) PCT No.: PCT/JP2011/005233
§ 371 (c)(1),
(2), (4) Date: Aug. 17, 2012

(87) PCT Pub. No.: WO2012/042773
PCT Pub. Date: Apr. 5, 2012

(65) Prior Publication Data
US 2012/0314355 A1    Dec. 13, 2012

(30) Foreign Application Priority Data
Sep. 28, 2010 (JP) .................. 2010-217661

(51) Int. Cl.
H05K 5/00 (2006.01)
H05K 7/00 (2006.01)
G11B 33/02 (2006.01)
H01M 2/10 (2006.01)
H04M 1/02 (2006.01)

(52) U.S. Cl.
CPC .......... H01M 2/1066 (2013.01); H04M 1/0262 (2013.01)
USPC ............ 361/679.01; 361/679.02; 361/679.09; 361/679.38; 361/679.39; 292/169.18; 369/77.11

(58) Field of Classification Search
USPC .............. 361/679.01–679.09, 679.1–679.19, 361/679.31–679.45, 679.55–679.6, 361/724–747; 248/80–88, 155.1–155.5, 248/166–173, 180.1–186.2, 229.1–231.51, 248/271.4, 292.14, 316.1–316.8; 369/75.1, 369/75.2, 75.11, 75.21, 76, 77.11, 77.21, 369/78, 79, 80, 81, 82; 292/1–62, 113, 292/169.11–169.23, 341.11–341.19
See application file for complete search history.

(56) References Cited

U.S. PATENT DOCUMENTS

| 2004/0048638 | A1* | 3/2004 | Inomata et al. | ............... 455/572 |
| 2005/0003860 | A1  | 1/2005 | Jung | |
| 2009/0124305 | A1* | 5/2009 | Tanimoto et al. | .......... 455/575.1 |

FOREIGN PATENT DOCUMENTS

| JP | 51-3855 Y1 | 2/1976 |
| JP | 4-76245 U | 7/1992 |
| JP | 11-054098 A | 2/1999 |
| JP | 2003-346746 A | 12/2003 |
| JP | 2005-32726 A | 2/2005 |
| JP | 2005-050753 A | 2/2005 |

OTHER PUBLICATIONS

International Search Report, mailed Dec. 20, 2011, for PCT/JP2011/005233, 4 pages.

* cited by examiner

*Primary Examiner* — Jerry Wu
(74) *Attorney, Agent, or Firm* — Seed IP Law Group PLLC

(57) ABSTRACT

An electronic device is provided which firmly holds a battery pack at the time of mounting the battery pack, and can easily eject the battery pack at the time of ejection. When a battery pack 11 is housed in a battery compartment 21, and a cover 30 is slid from an attachment start position P1 to an attachment completion position P0 to cover the battery compartment 21, a regulation member 32 disposed on a rear surface 301 of the cover 30 is engaged with a battery pack locking claw 221 of a battery pack holding member 22, which locks an upper surface 11A of the battery pack 11. As a result, the movement of the battery pack holding member 22 in a direction of disengaging the battery pack locking claw 221 is regulated so that the battery pack 11 can be surely prevented from coming off from the battery compartment 21. Also, when the cover 30 moves to the attachment start position P1, the regulation member 32 is also moved and disengaged from the battery pack locking claw 221. As a result, the battery pack locking claw 221 of the battery pack holding member 22 can be moved in the disengaging direction, and the cover 30 is removed so that the battery pack 11 can be easily ejected.

2 Claims, 15 Drawing Sheets

FIG. 1
(A)
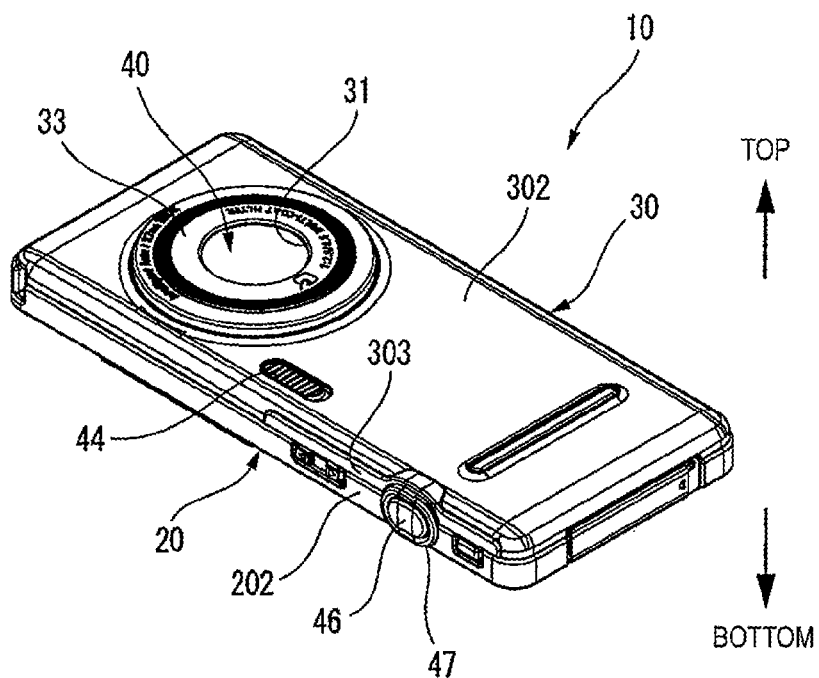
(B)
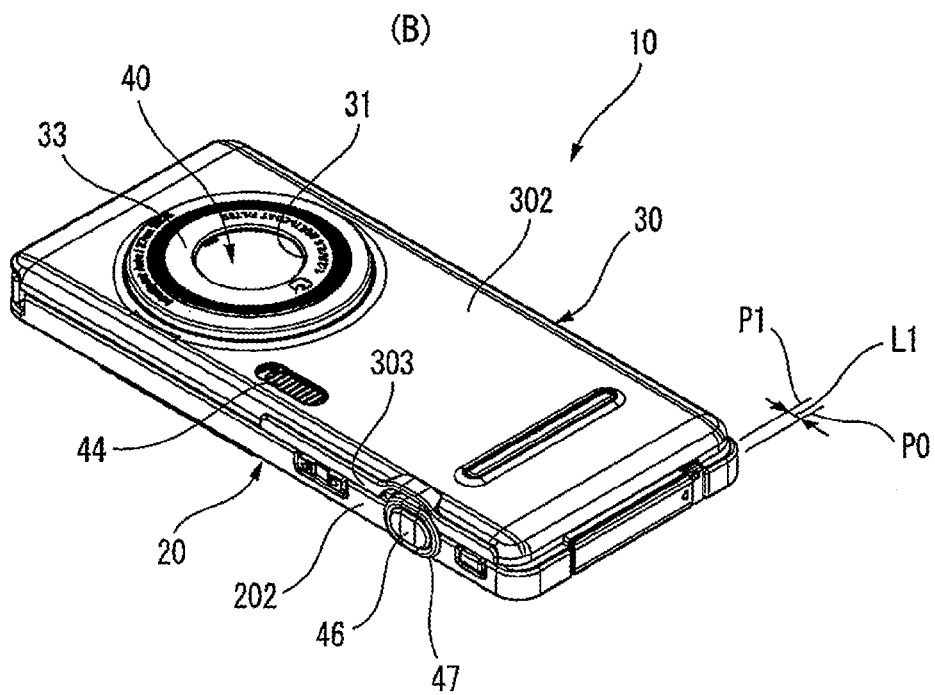

FIG. 2
(A)
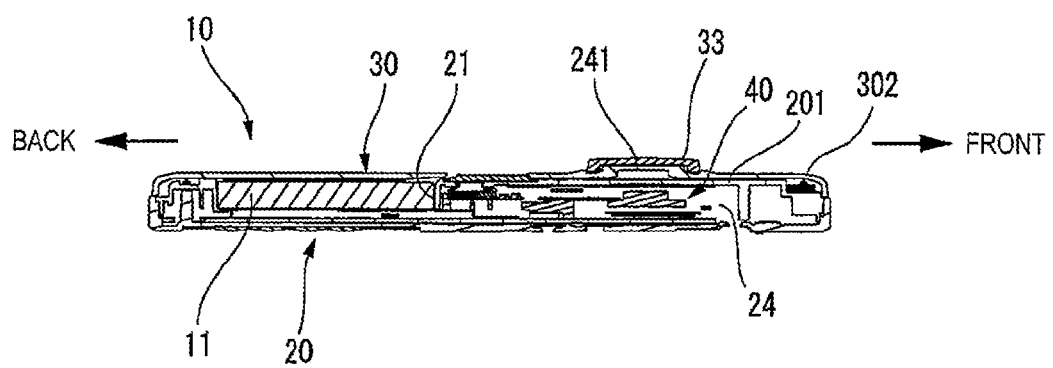
(B)
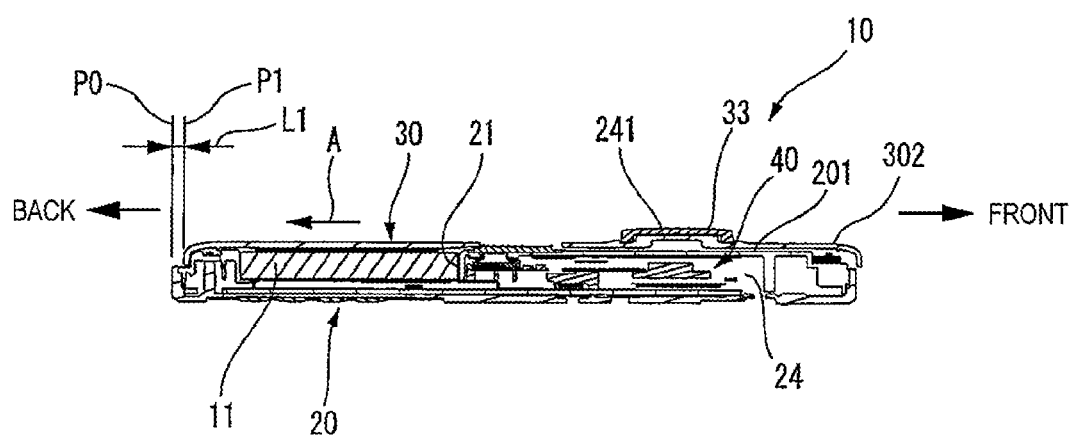

FIG. 6
(A)
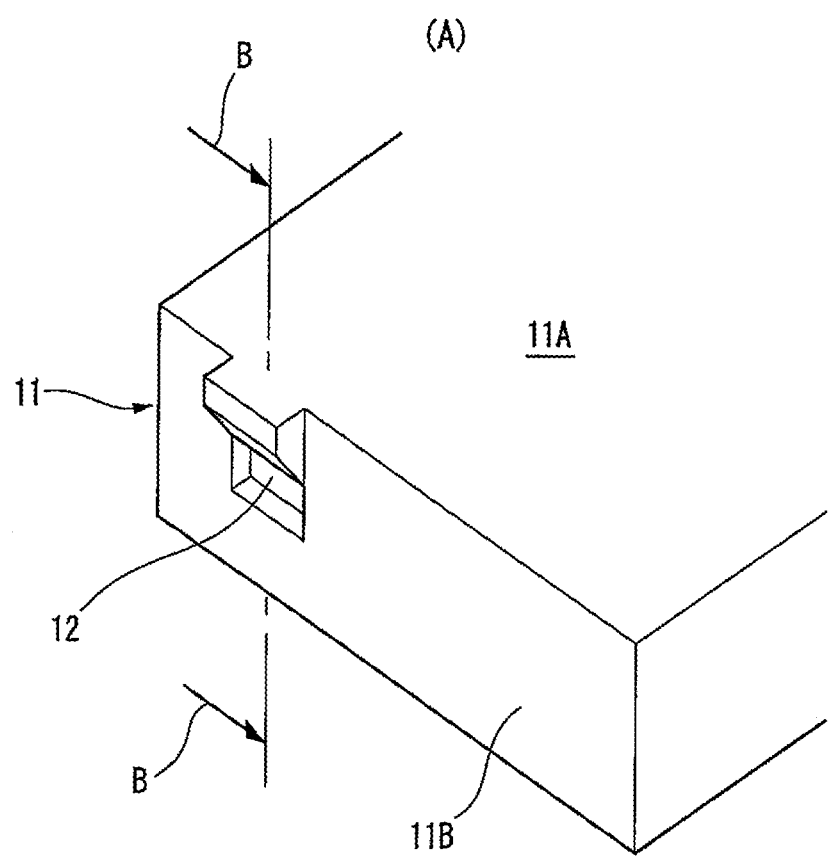
(B)
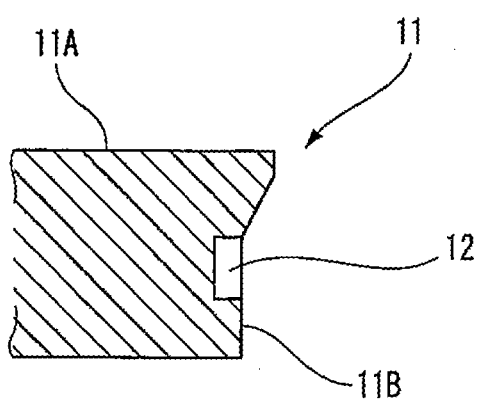

ELECTRONIC DEVICE

TECHNICAL FIELD

The present invention relates to an electronic device that detachably holds a battery in a compartment of the device.

BACKGROUND ART

In cellular phones which are recent electronic devices, a terminal of a card is frequently disposed in the periphery of a battery pack. For that reason, particularly when the card is used as a memory for camera functions, a cover is frequently opened and closed for card exchange. However, in this situation, if the battery pack may instantly come off, the battery pack is liable to be lost. On the other hand, if the battery pack is firmly fixed, inconvenience is caused when the terminal of the card is disposed below the battery pack. Also, it is conceivable that the battery pack is loosely fixed. However, in this case, the battery pack comes off within the cover during use of the cellular phone so that a power supply may suddenly turn off.

Under the circumstances, a structure has been proposed in which the battery can be firmly fixed in a state where the cover is closed whereas the battery can be simply removed without instantly coming off in a state where the cover is opened (for example, refer to Patent Literature 1).

As illustrated in FIG. 16, a battery compartment 101 in an electronic device 100 disclosed in Patent Literature 1 includes an engaging claw 102 and an operation member 103. The engaging claw 102 is swingably coupled to a support shaft so as to be swingable between a lock position where the engaging claw 102 is protruded from a first compartment lateral surface 104 and engaged with an engaging recess of the battery housed in the battery compartment 101, and an unlock position where the engaging claw 102 is retreated from the first compartment lateral surface 104 and gets away from the engaging recess. The operation member 103 is disposed on an outer surface 106 of a main body 105 facing the first compartment lateral surface 104. The operation member 103 is swingably coupled to the support shaft, and also movably coupled thereto so as to be movable between the lock position and the unlock position which are distant from each other along the support shaft.

Accordingly, when the battery is housed in the battery compartment 101, the engaging claw 102 is engaged with the engaging recess of the battery, thereby coming into a battery housing retention state. Also, when the operation member 103 is moved from the lock position to the unlock position, and the operation member 103 is also moved away from the battery, the engaging claw 102 is disengaged from the engaging recess of the battery, thereby coming into a state where the battery can be removed.

CITATION LIST

Patent Literature

Patent Literature 1: JP-A-2003-346746 (FIG. 1)

SUMMARY OF INVENTION

Technical Problem

However, in the conventional electronic device disclosed in the above-mentioned Patent Literature 1, there arises such a problem that the battery may come off if the operation member 103 is moved while the battery is mounted for some reason.

The present invention has been made to solve the problem with the conventional art, and therefore an object of the present invention is to provide an electronic device that can firmly hold the battery pack at the time of mounting the battery pack, and the battery pack can be easily ejected at the time of ejection.

Solution to Problem

According to a first aspect of the present invention, there is provided an electronic device including a case; a recessed battery compartment that is disposed in the case; a battery pack that is housed in the battery compartment; a cover that is attached to the case while sliding relative to the case from an attachment start position at which the cover partially covers the battery compartment to an attachment completion position at which the cover entirely covers the battery compartment, for covering the battery compartment; a battery pack holding member that is disposed on an inner surface of the battery compartment, and has a battery pack locking claw that can be receded and protruded toward an end surface of the battery pack, and lock an upper surface of the battery pack; and a regulation member that is disposed on a surface of the cover on the case side, and regulates a movement of the battery pack holding member by engagement with the battery pack locking claw when the cover is located at the attachment completion position.

Also, according to a second aspect of the present invention, the electronic device includes an elastic member that urges the battery pack holding member toward the end surface of the battery pack.

Also, according to a third aspect of the present invention, in the electronic device, the upper surface of the battery pack locking claw is a down-slope surface toward the upper surface of the battery pack.

Further, according to a fourth aspect of the present invention, in the electronic device, the end surface of the battery pack has a locking recess located at a position corresponding to the battery pack engaging claw.

Advantageous Effects of Invention

According to the present invention, when the battery pack is housed in the battery compartment, and the cover slides from the attachment start position to the attachment completion position to cover the battery compartment, the regulation member disposed on a rear surface of the cover is engaged with the battery pack locking claw of the battery pack holding member that holds the battery pack by locking the upper surface of the battery pack. As a result, the movement of the battery pack holding member in a direction of disengaging the battery pack locking claw is regulated so that the battery pack can be surely prevented from coming off from the battery compartment. Also, when the cover moves to the attachment start position, the regulation member is also moved and disengaged from the battery pack locking claw. As a result, there can be provided the electronic device having such advantages that the battery pack locking claw of the battery pack holding member can be moved in the disengaging direction, and the cover is removed so that the battery pack can be easily ejected.

BRIEF DESCRIPTION OF DRAWINGS

FIG. 1(A) is an overall perspective view illustrating a state in which a cover is attached to a case in a mobile terminal according to an embodiment of the present invention, and FIG. 1(B) is an overall perspective view illustrating a state in which the cover is slid and removed.

FIG. 2(A) is a cross-sectional view illustrating the state in which the cover is attached to the case, and FIG. 2(B) is a cross-sectional view illustrating the state in which the cover is slid and removed.

FIG. 6(A) is a perspective view of an end surface of a battery pack, and FIG. 6(B) is a cross-sectional view taken along a line B-B in FIG. 6(A).

MODE FOR CARRYING OUT THE INVENTION

Figure 3:
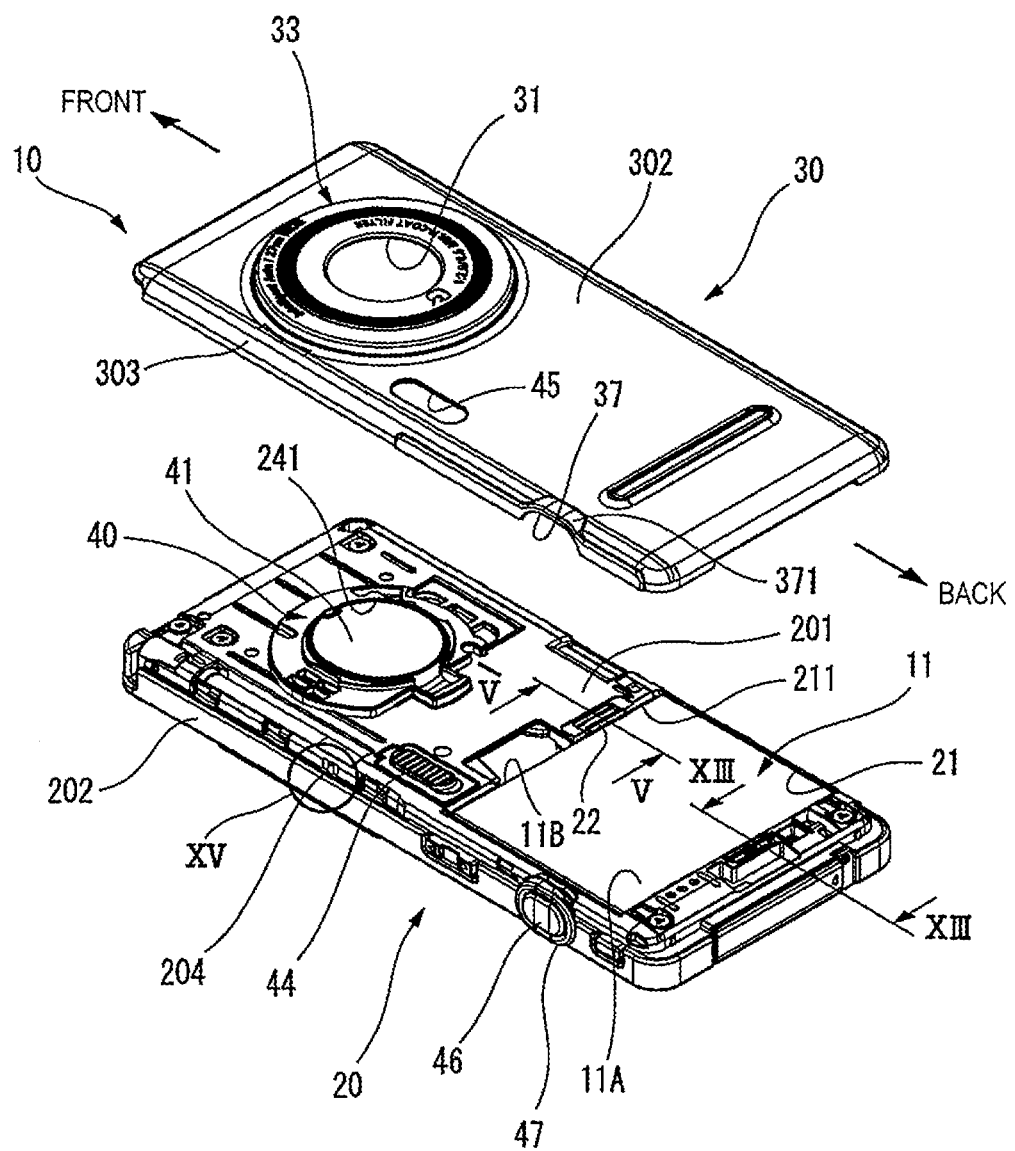
FIG. 3 is an exploded perspective view illustrating a state in which the cover is removed from the case.

Hereinafter, an electronic device according to an embodiment of the present invention will be described with reference to the drawings.

As illustrated in FIGS. 1(A) and 1(B), a mobile terminal 10, which is an electronic device according to the embodiment of the present invention, includes a rectangular box case 20, and a cover 30 that entirely covers a surface 201 of the case 20. A camera unit 40 is exposed from a camera opening part 31 disposed in the cover 30.

A front cover (not shown) having a display plate or an operation part is attached to another surface of the case 20 opposite to the cover 30.

Also, in the following description, an upper side represents a cover 30 side, and a lower side represents a case 20 side.

As illustrated in FIGS. 2(A) and 2(B), the case 20 is equipped with a recessed battery compartment 21 opened on the cover 30 side, in which a battery pack 11 is housed. The cover 30 also functions as a cap member that covers the battery compartment 21.

When the cover 30 is attached to the case 20, as illustrated in FIGS. 1(B) and 2(B), the cover 30 is placed on the surface 201 of the case 20 at an attachment start position P1 where the cover 30 partially covers the battery compartment 21. Then, the cover 30 is slid backward (a direction of an arrow A in FIG. 2(B) relatively while maintaining a relative position to the case 20 in a thickness direction, that is, in parallel to the surface 201 of the case 20 so as to slide to an attachment completion position P0 where the cover 30 entirely covers the battery compartment 21. As a result, the cover 30 is attached to the case 20 to cover the entire surface of the case 20. The amount of slide during the above operation is a distance L1 between the attachment start position P1 and the attachment completion position P0 (refer to FIG. 1(B)).

Figure 4:
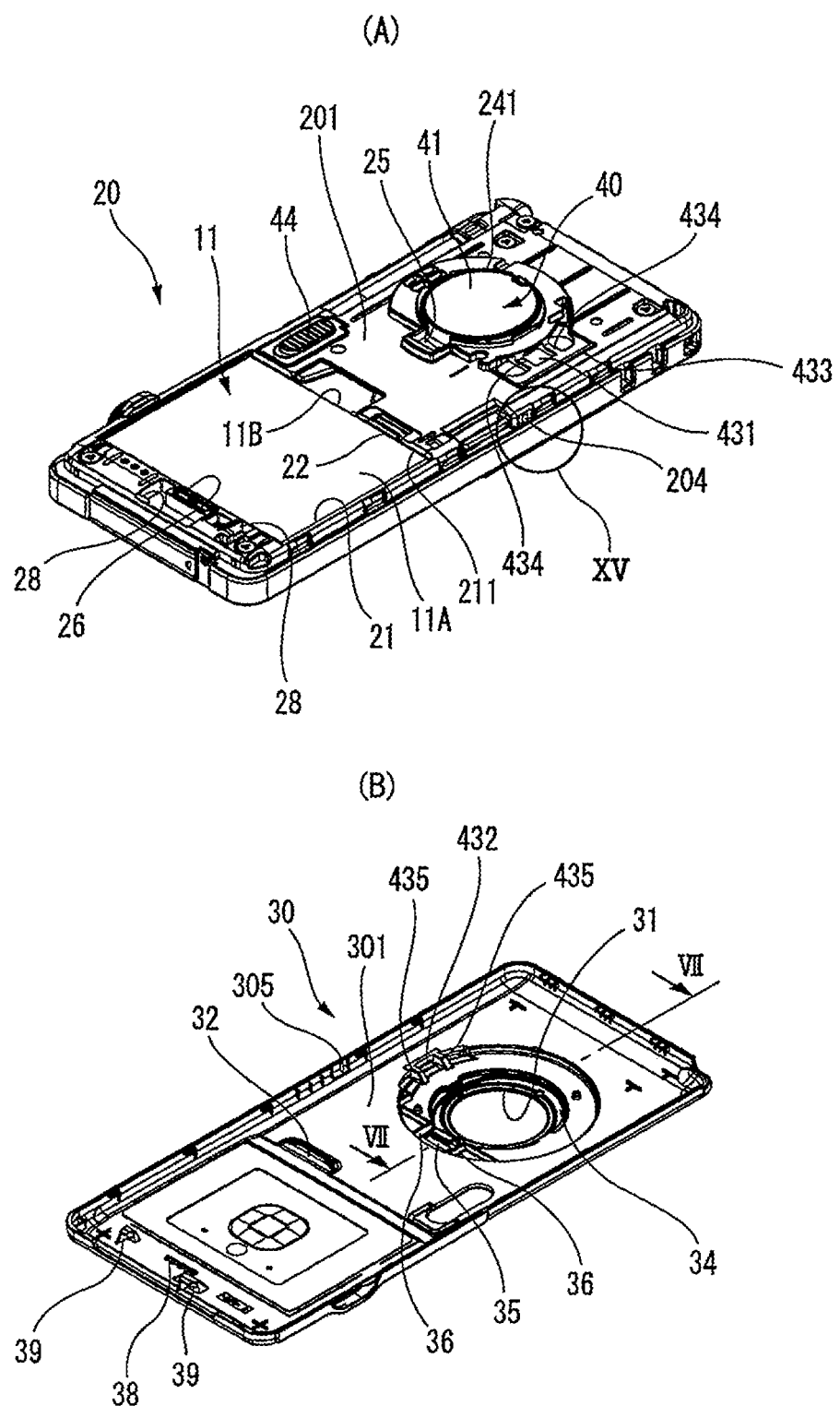
FIG. 4(A) is an overall perspective view of the case.
FIG. 4(B) is an overall perspective view of an inner surface of the cover.

As illustrated in FIGS. 3 and 4(A), 4(B), an inner surface 211 of the battery compartment 21 is equipped with a battery pack holding member 22 that can be receded and protruded toward an end surface 11B of the battery pack 11, and holds the battery pack 11.

Figure 5:
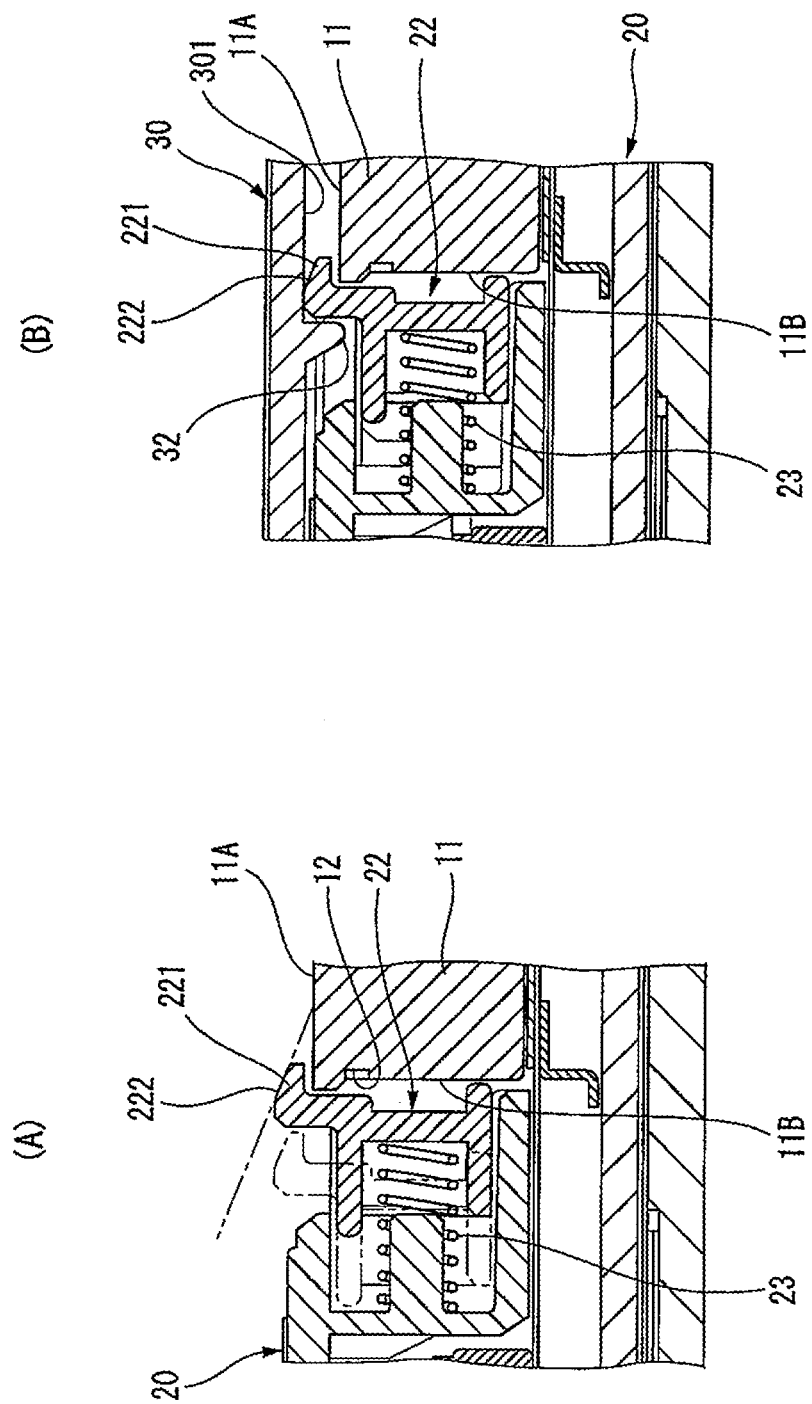
FIG. 5(A) is a cross-sectional view taken along a line V-V in FIG. 3.
FIG. 5(B) is a cross-sectional view illustrating a state in which a battery pack holding member is regulated by a regulation member.

As illustrated in FIG. 5(A), the battery pack holding member 22 has a battery pack locking claw 221 that is protruded superiorly and anteriorly in a reverse L-shape, and blocks an upper surface 11A of the battery pack 11. An upper surface 222 of the battery pack locking claw 221 is a down-slope surface extending from a base end of the battery pack locking claw 221 to a tip thereof toward the upper surface 11A of the battery pack 11.

Also, the battery pack holding member 22 is always urged toward the end surface 11B of the battery pack 11 by a holding member spring 23 that is an elastic member.

Accordingly, when the battery pack 11 is housed in the battery compartment 21, an end surface (not shown) of the battery pack 11 opposite to the end surface 11B is caught with the battery compartment 21, and the upper surface 222 of the battery pack locking claw 221 of the battery pack holding member 22 is pushed on the end surface 11B side of the battery pack 11 so that the battery pack 11 is housed therein while the battery pack holding member 22 is retreated along the slope surface of the upper surface 222.

Then, when the battery pack 11 moves to a lower side of the battery pack locking claw 221, the battery pack holding member 22 is pushed out by the holding member spring 23, and the battery pack is locking claw 221 locks the upper surface 11A of the battery pack 11.

As illustrated in FIGS. 4(A) and 5(B), a rear surface 301 of the cover 30 is equipped with a regulation member 32 that is engaged with the battery pack locking claw 221 when the cover 30 is located at the attachment completion position P0 (refer to FIG. 2(B).

The regulation member 32 regulates the movement of the battery pack holding member 22 which has held the battery pack 11 away from the battery pack 11 (left side in FIG. 5(B)).

On the other hand, as illustrated in FIGS. 6(A) and 6(B), the end surface 11B of the battery pack 11 is provided with a locking recess 12 at position corresponding to the battery pack locking claw 221 of the battery pack holding member 22 when the battery pack 11 is housed.

Accordingly, when the battery pack 11 is removed from the battery compartment 21, the battery pack 11 can be easily removed by one hand.

Hereinafter, the removal of the battery pack 11 will be described in more detail. When the battery pack holding member 22 urged toward the battery pack 11 side by the holding member spring 23 is retreated in a removal direction against the urging force of the holding member spring 23, the locking recess 12 of the battery pack 11 is exposed. In this state, since a finger used for retreating the battery pack holding member 22 exists in the vicinity of the locking recess 12 of the battery pack 11, the locking recess 12 is caught with the finger so that the battery pack 11 can be ejected.

As illustrated in FIGS. 2(A) and 2(B), the surface 201 of the case 20 is provided with a recess 24 (hereinafter referred to as "camera recess 24") that houses the camera unit 40 therein. The cover 30 is provided with the camera opening part 31 (refer to FIGS. 1(A) and 1(B)) opposed to the camera recess 24. A frame member 33 that is a circular cylinder is disposed in the vicinity of the camera opening part 31 of a surface 302 of the cover 30.

An edge rib 241 is erected on the camera recess 24 as an edge part along an edge thereof.

Figure 7:
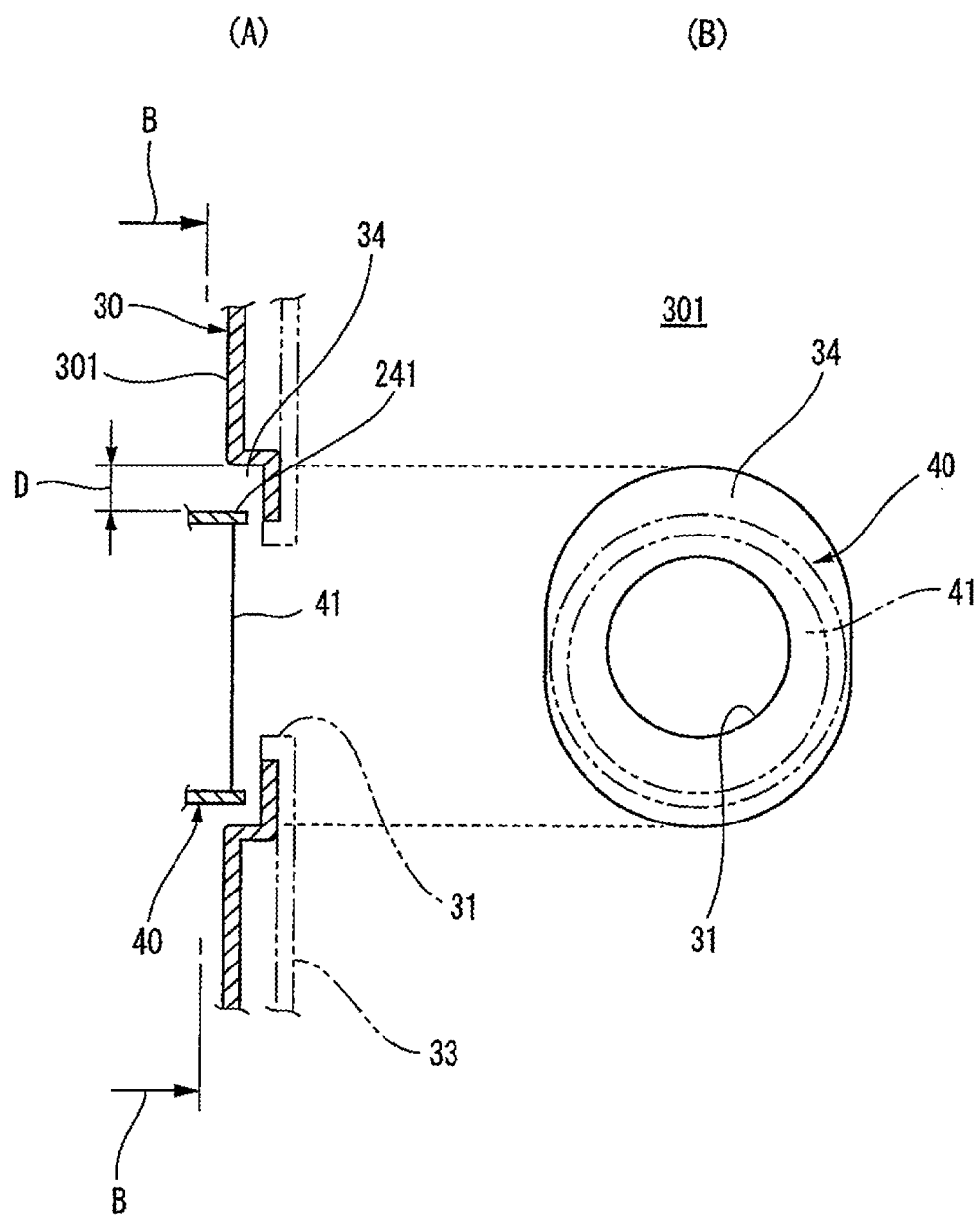
FIG. 7(A) is a cross-sectional view taken along a line VII-VII in FIG. 4(B)
FIG. 7(B) is a cross-sectional view taken along a line B-B in FIG. 7(A).

On the other hand, the camera unit 40 is housed in the camera recess 24, a top of a camera lens 41 located at a tip of the camera unit 40 is so positioned as to be lower than the edge rib 241 (refer to FIG. 7(A)).

As illustrated in FIGS. 7(A) and 7(B), a lens movement recess 34, which is protruded toward the surface 302 side of the cover 30, is dispose in the periphery of the camera opening part 31 in the rear surface 301 of the cover 30. The camera lens 41 and the edge rib 241 are housed in the interior of the lens movement recess 34. The cover 30 is slid in a vertical direction in FIGS. 7(A) and 7(B) so as to move relatively in the vertical direction in the interior of the lens movement recess 34.

The lens movement recess 34 is shaped into an oval having a width that can house the edge rib 241, and has a movable margin D. The lens movement recess 34 may not be shaped into the oval. The lens movement recess 34 may be shaped into a large circle or with a is linear portion if a space that can house the edge rib 241 can be ensured.

Accordingly, even if the cover 30 is slid between the attachment start position P1 and the attachment completion position P0, the camera lens 41 viewed from the camera opening part 31 of the frame member 33 of the cover 30 is always shaped into a true circle. As a result, the excellent exterior can be kept.

Figure 8:
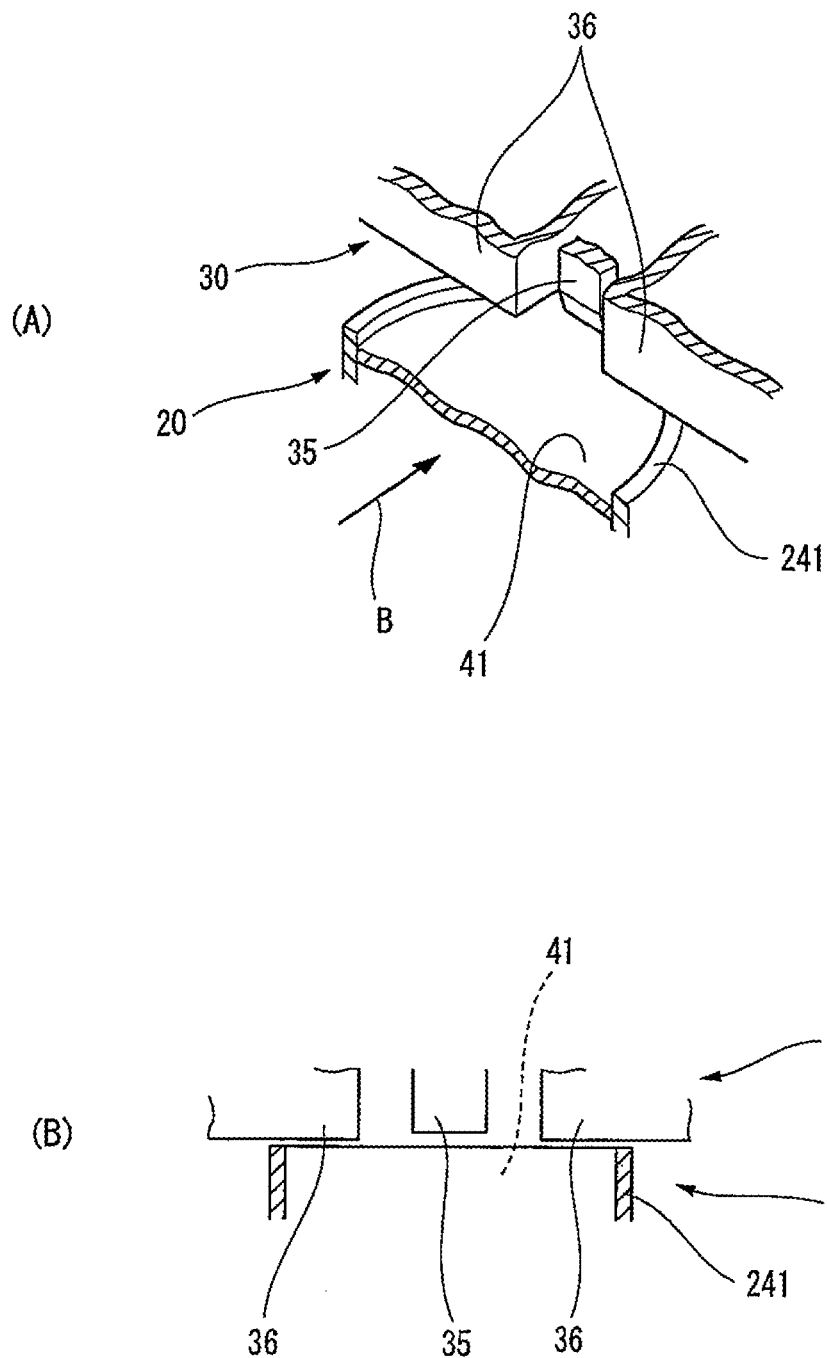
FIG. 8(A) is a perspective view illustrating a relationship between each of an engaging protrusion and an abutting part, and a camera lens.
FIG. 8(B) is a front view taken from a direction B in FIG. 8(A).

As illustrated in FIGS. 4(B) and 8(A), an engaging protrusion 35 is disposed in the center of the rear surface 301 of the cover 30. Also, abutting parts 36 (refer to FIG. 8(B)), which are protruded toward the case 20 more than a tip position of the engaging protrusion 35, are disposed adjacent to the engaging protrusion 35. A pair of the abutting parts 36 is disposed to sandwich the engaging protrusion 35 therebetween.

In this example, the abutting parts 36 are each formed into an L-shaped rib, but may be formed into other shapes, for example, a rectangular flat plate.

On the other hand, as illustrated in FIG. 4(A), the surface 201 of the case 20 is provided with an engaging hole portion 25 into which the engaging protrusion 35 is inserted when the cover 30 slides to the attachment completion position P0.

Accordingly, in attaching the cover 30 to the case 20, when the cover 30 is positioned to the attachment start position P1, and the cover 30 is slid toward the attachment completion position P0, the engaging protrusion 35 is engaged with the engaging hole portion 25. In this situation, since the abutting parts 36 are protruded toward the case 20 more than the engaging protrusion 35, even if the abutting parts 36 are abutted against the upper surface of the edge rib 241, the engaging protrusion 35 are not abutted against the camera lens 41.

Figure 9:
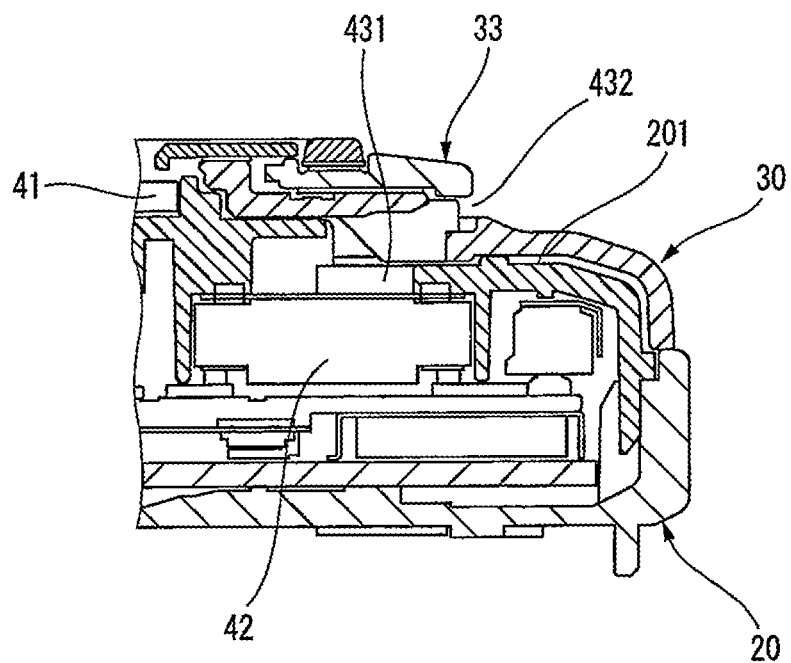
FIG. 9 is a cross-sectional view of a speaker attachment part.

As illustrated in FIG. 9, a speaker 42 is fitted in the vicinity of the camera lens 41 in the case 20.

As illustrated in FIG. 4(A), a first stop 431 for emitting sound from the speaker 42 to an outside of the case 20 is opened in the surface 201 of the case 20 above the speaker 42 at a position adjacent to the camera lens 41. Two bars 434 are disposed to cross the first stop 431 to divide the first stop 431 into three pieces.

Also, as illustrated in FIG. 4(B), a second stop 432 that communicates between the inside and the outside of the cover 30 for emitting sound to the outside of the cover 30 is provided in an attachment part for the cover 30, of the frame member 33 for the camera lens 41. Two bars 435 are disposed to cross the second stop 432 to divide the second stop 432 into three pieces.

Further, as illustrated in FIG. 4(A), a stop wall 433 is formed on the surface 201 of the case 20 so as to surround the first stop 431. When the cover 30 is located at the attachment completion position, the stop wall 433 guides the sound emitted from the first stop 431 to the second stop 432.

As illustrated in FIGS. 1(A) and 1(B), a flashlight 44 used to take a picture by the camera unit 40 is exposed from the surface 302 of the cover 30.

As illustrated in FIG. 3, the flashlight 44 is fitted to the surface 201 of the case 20, and an oval light hole 45 is provided at a corresponding position in the cover 30.

Figure 10:
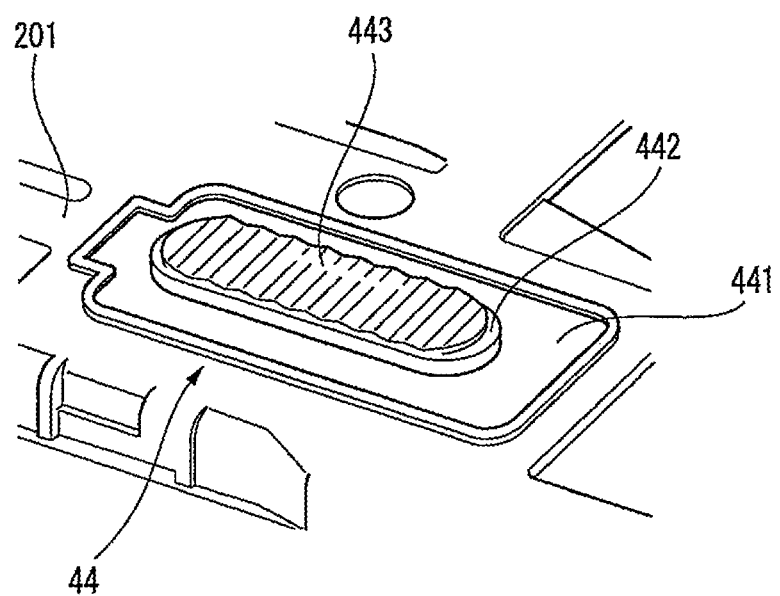
FIG. 10 is a perspective view of a flashlight.

As illustrated in FIG. 10, the flashlight 44 includes a base layer 441 of, for example, a rectangular plate, which is larger than the light hole 45, an oval intermediate layer 442 laminated on the base layer 441, and a light emitting layer 443 laminated on the intermediate layer 442 for emitting a light.

It is desirable that the base layer 441 has, for example, an upper surface formed with a color such as silver which reflects the light, so as to function as a reflector. A circular opening is positioned above a light emitter 444 (refer to FIGS. 11(A) and 11(B)), and allows the external to be exposed to the light of the light emitter 444.

The intermediate layer 442 is made of, for example, a transparent resin. The intermediate layer 442 is shielded with the cover 30 when the cover 30 is located at the attachment start position P1, and exposed at the time of use where the cover 30 is located at the attachment completion position P0.

The light emitting layer 443 is made of a transparent resin integrally with the intermediate layer 442, and has a surface formed into a corrugated sheet to diffuse the light from the light emitter 444 in a given range.

Figure 11:
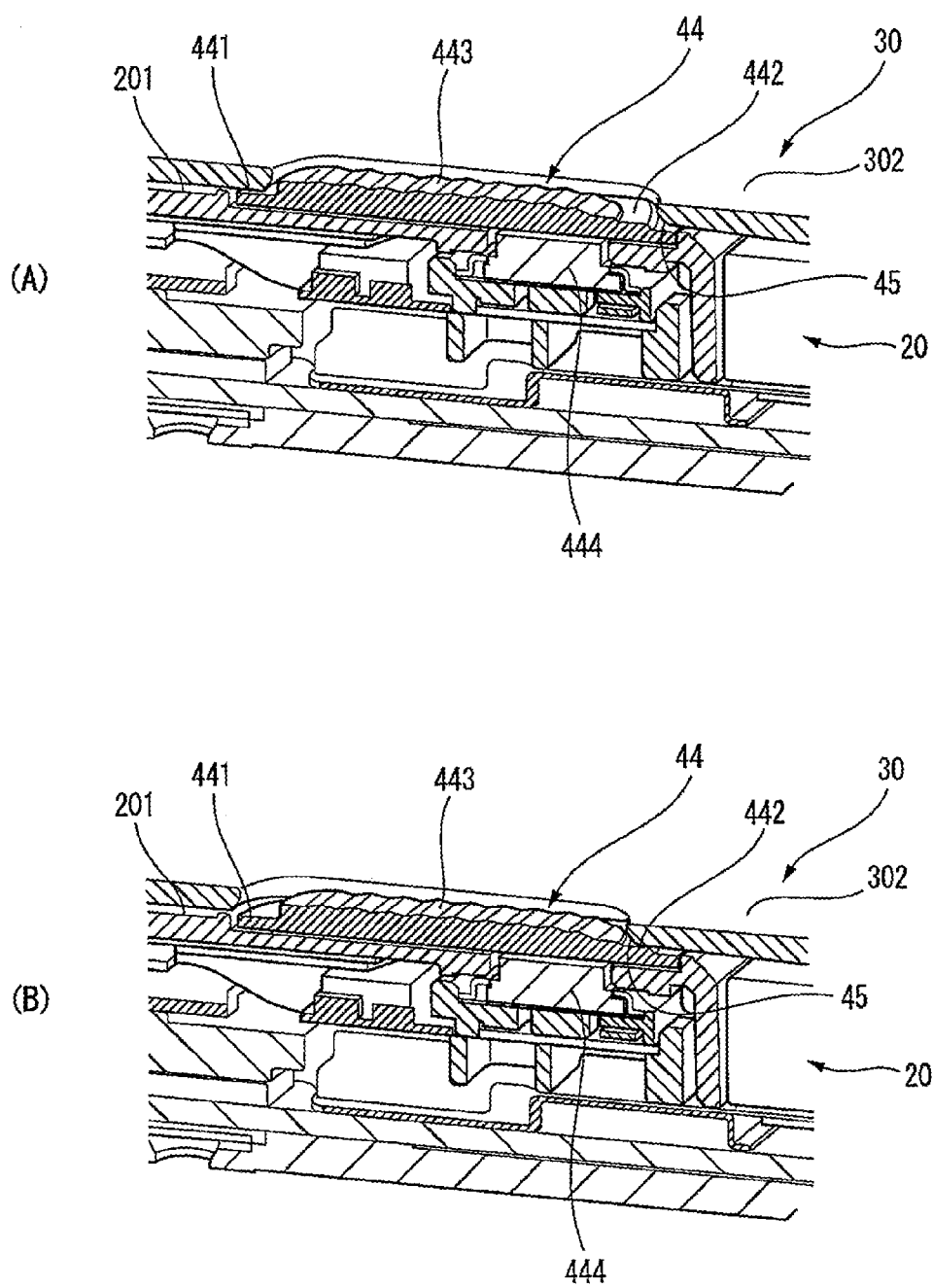
FIG. 11(A) is a perspective view illustrating a state in which the cover is located at an attachment completion position.
FIG. 11(B) is a perspective view illustrating a state in which the cover is located at an attachment start position.

Accordingly, as illustrated in FIG. 11(B), when the cover 30 is located at the attachment start position P1, a part of the base layer 441 is exposed from the light hole 45, and the intermediate layer 442 is shielded under the cover 30.

On the other hand, as illustrated in FIG. 11(A), at the point of use where the cover 30 is located at the attachment completion position P0, the base layer 441 is not exposed from the light hole 45, but a part of the intermediate layer 442 is exposed from the light hole 45.

As illustrated in FIGS. 1(A), 1(B) and 12(A), 12(B), 12(C), a shutter switch 46 for actuating the camera unit 40 and allowing the flashlight 44 to emit the light is disposed on a lateral surface 202 of the case 20.

An oval flange member 47 is disposed on the lateral surface 202 of the case 20, and the shutter switch 46 is disposed inside the oval flange member 47 so as to be depressed.

On the other hand, as illustrated in FIG. 3, an edge 371 is disposed to correspond to a shape of the flange member 47, and a shutter switch notch 37 is disposed inside of the edge 371.

Figure 12:
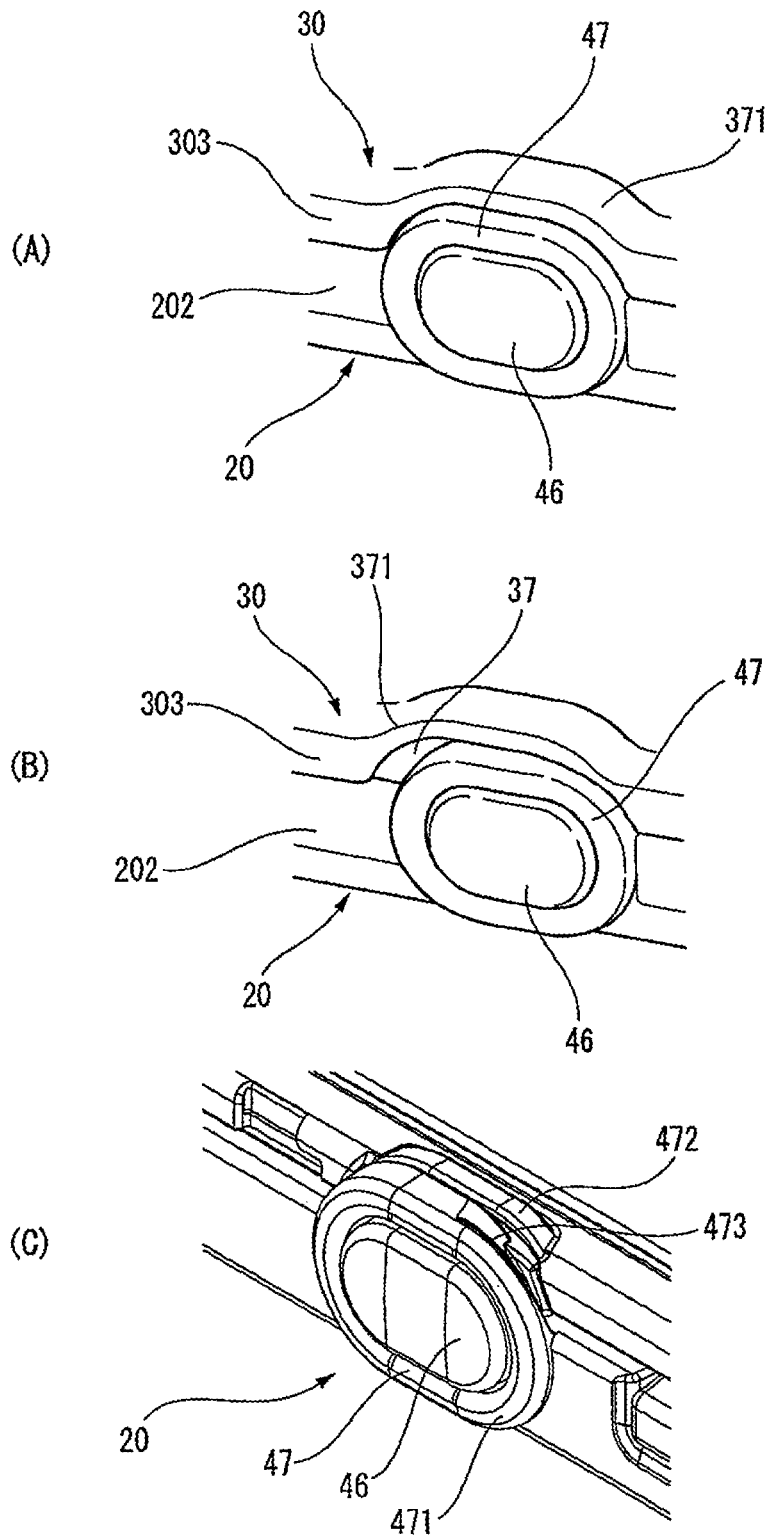
FIG. 12(A) is a perspective view illustrating a shutter switch when the cover is located at the attachment completion position.
FIG. 12(B) is a perspective view illustrating the shutter switch when the cover is located at the attachment start position.
FIG. 12(C) is a perspective view illustrating a back clearance in a flange member.

The shutter switch notch 37 is formed into substantially a semioval shape in correspondence with the shape of the flange member 47. As illustrated in FIG. 12(A), the shutter switch notch 37 is not exposed when the cover 30 is located at the attachment completion position P0.

On the other hand, as illustrated in FIG. 12(B), when the cover 30 is located at the attachment start position P1, the shutter switch notch 37 is exposed to the outside of the flange member 47.

As illustrated in FIG. 12(C), the shutter switch notch 37 is includes a mounting member 471 exposed from the lateral surface 202 of the case 20, and a cylindrical member 472 that is integrally disposed at the rear of the mounting member 471, and fitted to the lateral surface 202 of the case 20. A back clearance 473 where an outer peripheral surface of the cylindrical member 472 is recessed toward the inside of the mounting member 471 (left side in FIG. 12(C)) is disposed in a side end of the cylindrical member 472 in the attaching direction of the cover 30 (right side in FIG. 12(C)).

The edge 371 of the cover 30 that is located at the attachment start position P1 can enter the back clearance 473. Therefore, in attachment of the cover 30, back clearance 473 prevents the edge 371 from interfering with the cylindrical member 472.

As illustrated in FIG. 4(A), a first protrusion 26 that can be receded and protruded from the surface 201 of the case 20 is disposed on an end of the battery compartment 21.

On the other hand, as illustrated in FIG. 4(B), a second protrusion 38, which passes while sinking the first protrusion 26 when the cover 30 slides between the attachment start position P1 and the attachment completion position P0, is disposed on the rear surface 301 of the cover 30.

Figure 13:
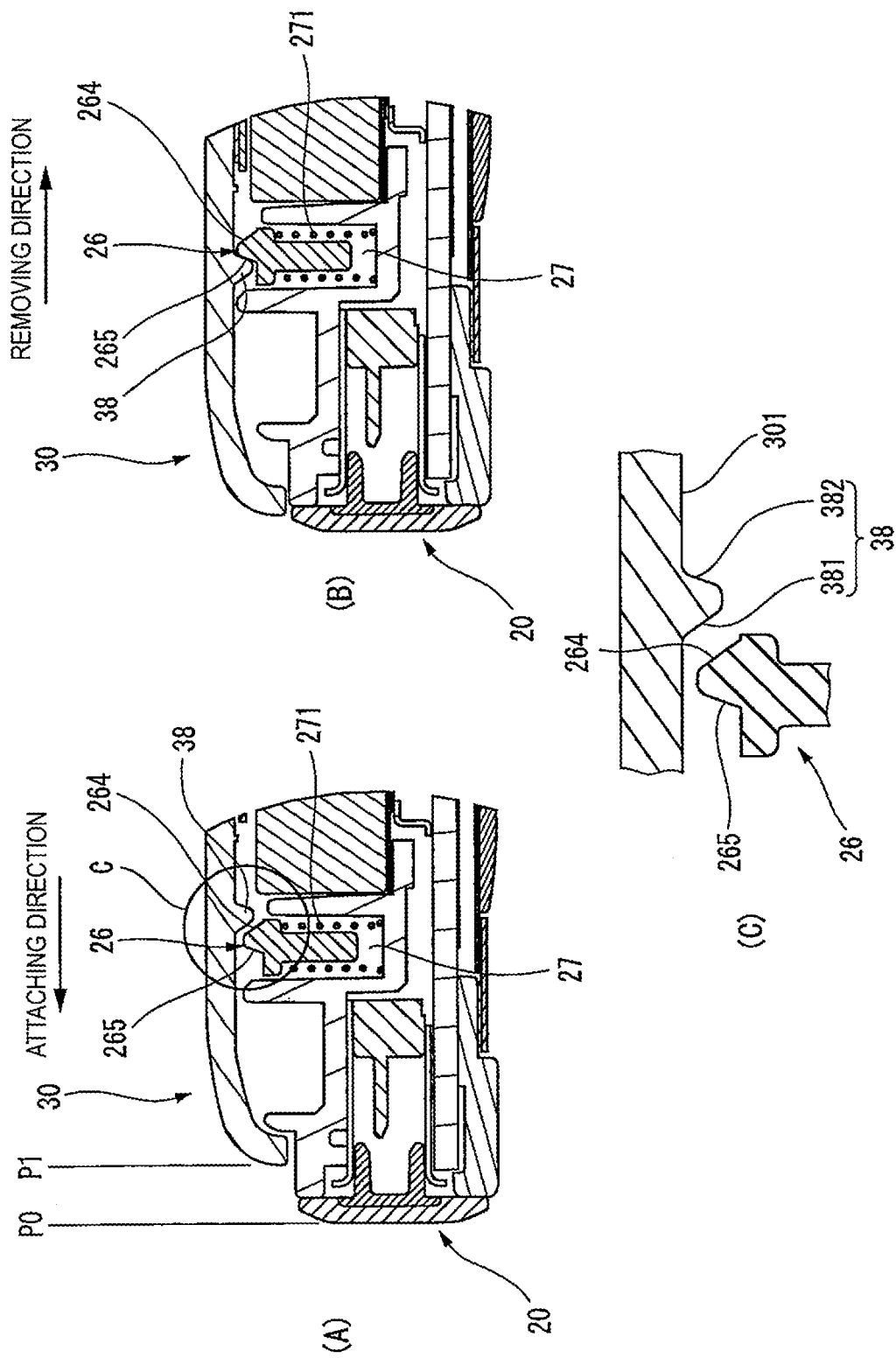
FIG. 13(A) is a cross-sectional view taken along a line XIII-XIII in FIG. 3, illustrating a state in which the cover is located at the attachment start position.
FIG. 13(B) is a cross-sectional view illustrating a state in which the cover is located at the attachment completion position.
FIG. 13(C) is an enlarged view of a portion C in FIG. 13(A).

As illustrated in FIGS. 13(A), 13(B), and 13(C), the first protrusion 26 is held within a first protrusion guide part 27 disposed on the case 20 so as to be movable in the vertical direction. The first protrusion 26 is urged superiorly by a first protrusion spring 271 that is an elastic member.

Figure 14:
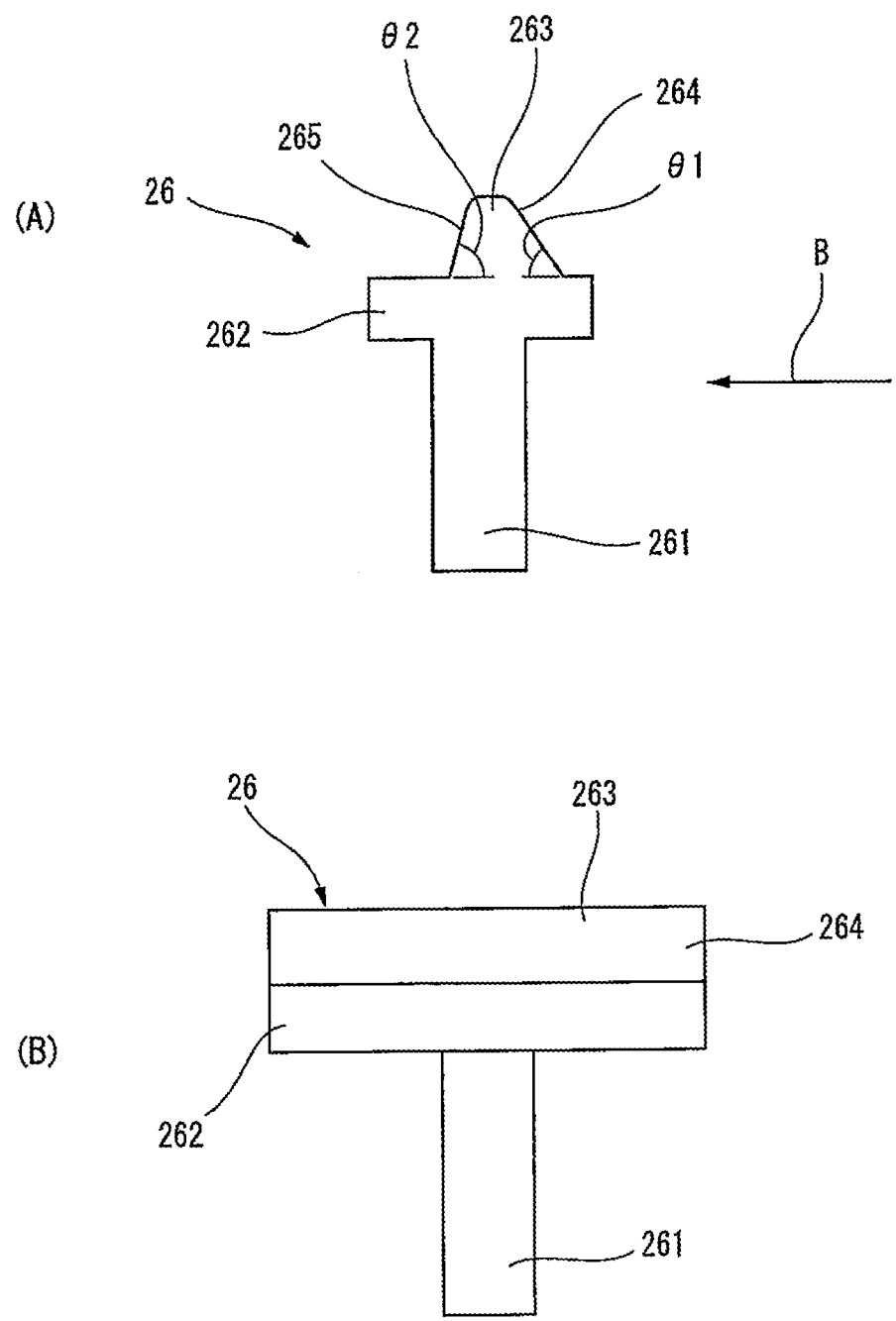
FIG. 14(A) is a side view of a first protrusion.
FIG. 14(B) is a front view viewed from a direction B in FIG. 14(A).

As illustrated in FIGS. 14A and 14B, the first protrusion 26 includes a pillar part 261 on which the first protrusion spring 271 is wound, a planar base part 262 that is disposed on a top of the pillar part 261, and a mountain protrusion 263 that is disposed on the planar base part 262.

The mountain protrusion 263 includes a first attachment slope surface 264 that comes in contact with the second protrusion 38 when the cover 30 slides from the attachment start position P1 to the attachment completion position P0, that is, slides in an attaching direction (refer to FIG. 13(A)), and a first removal slope surface 265 that comes in contact with the second protrusion 38 when the cover 30 slides from the attachment completion position P0 to the attachment start position P1, that is, slides in a removing direction (refer to FIG. 13(B)).

On the other hand, as illustrated in FIG. 13(C), the second protrusion 38 includes a second attachment slope surface 381 and a second removal slope surface 382 which can slide in surface contact with the first attachment slope surface 264 and the first removal slope surface 265 of the first protrusion 26, respectively.

As illustrated in FIG. 14(A), it is desirable that an inclination angle θ1 of the first attachment slope surface 264 to a sliding direction of the cover 30 is gentler than an inclination angle θ2 of the first removal slope surface 265 thereto. For example, it is desirable that θ1=about 55 degrees and θ2=about 70 degrees.

With the above configuration, the cover 30 can be easy slid at is the time of attaching the cover 30, but a higher force is required than that required for attachment at the time of removing the cover 30 with the result that the cover 30 can be prevented from carelessly coming off.

Similarly, in the second protrusion 38, it is desirable that an inclination angle of the second removal slope surface 382 is gentler than an inclination angle of the second removal slope surface 382.

As the angle of the inclination surface is steeper, a force component for pressing the first protrusion spring 271 at the time of sliding the cover 30 becomes smaller. Therefore, a force required for sliding becomes larger, and the first protrusion 26 is liable to be scraped off. On the other hand, if the angle is flatter, the force required for sliding becomes smaller, and the first protrusion 26 is difficult to scrape off.

For that reason, it is desirable that the angle is made flatter if the urging force of the first protrusion spring 271 is larger whereas the angle is made steeper if the urging force is smaller.

As illustrated in FIG. 4(B), each of tongue parts 39 is disposed on an end of the rear surface 301 of the cover 30. As illustrated in FIG. 4(A), each of tongue insertion parts 28 into which the tongue part 39 is inserted when the cover 30 is located at the attachment completion position P0 is disposed in the surface 201 of the case 20 at a position adjacent to the first protrusion 26.

As a result, when the cover 30 is located at the attachment completion position P0, the first protrusion 26 urged superiorly by the is first protrusion spring 271 is prevented from pushing up the cover 30 through the second protrusion 38.

The tongue part 39 and the tongue insertion part 28 are not limited to the above arrangement, but may be arranged at any position if the tongue part 39 and the tongue insertion part 28 are arranged in the periphery of the first protrusion 26, and the tongue part 39 is located at a position where the tongue part 39 is inserted into the tongue insertion part 28 before the first protrusion 26 comes into contact with the second protrusion 38.

Also, the number of pairs of the tongue part 39 and the tongue part 39 is not limited to two, but may be one or three or more.

Figure 15:
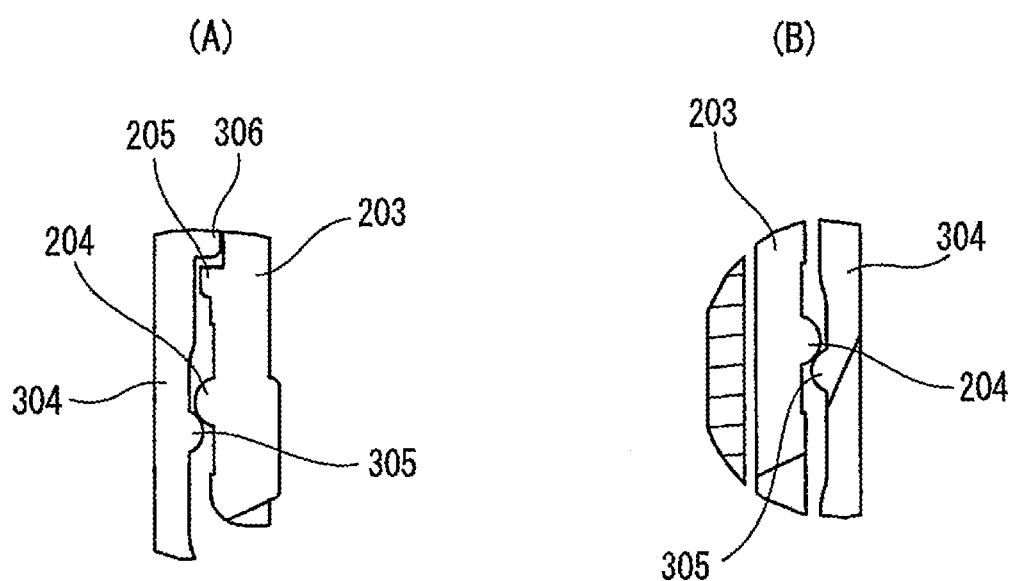
FIG. 15(A) is an enlarged view of a position XV in FIG. 3.
FIG. 15(B) is an enlarged view of a position XV in FIG. 4(A).
Figure 16:
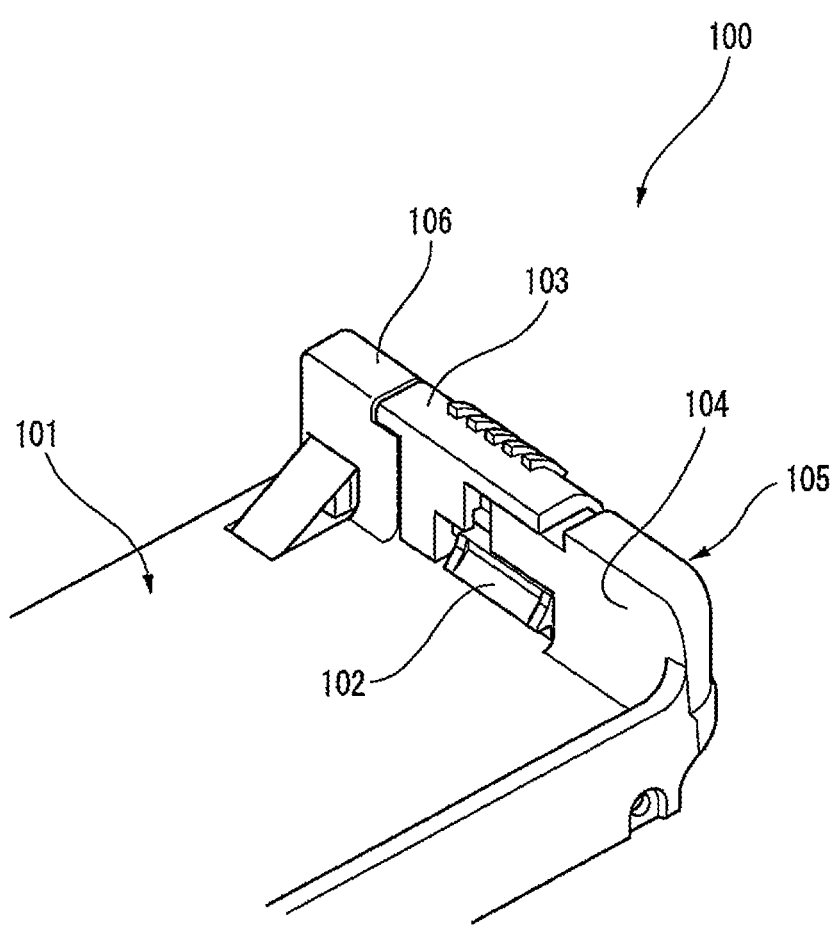
FIG. 16 is a perspective view of a battery compartment in a conventional electronic device.

As illustrated in FIGS. 15(A) an 15(B), a cover side wall protrusion 305 that is protruded toward the case 20 side is disposed on a cover side wall 304 of the cover 30 which is disposed along the sliding direction relative to the case 20 (refer to FIG. 4(B)).

Also, a case side wall protrusion 204 that is protruded toward the cover 30 side is disposed on a case side wall 203 of the case 20 which is substantially parallel to the cover side wall 304 (refer to FIGS. 3 and 4(A)).

Also, as illustrated in FIG. 15(A), a regulation protrusion 205 that is protruded toward the cover side wall 304 is disposed on the case side wall 203. The regulation protrusion 205 on the cover side is located at a position of the case 20 side corresponding to a regulation protrusion 306, and prevents abutment of the cover side wall protrusion 305 and the regulation protrusion 306 from being released. As will be described later, the cover side wall protrusion 305 and the case side wall protrusion 204 are abutted against each other to prevent backlash in a width direction (width direction of the case 20 in this embodiment). For that reason, when the positions of the cover side wall protrusion 305 and the case side wall protrusion 204 in the sliding direction are displaced so as not to be abutted against each other, the backlash in the width direction of the case 20 cannot be prevented. Under the circumstances, a distance between the cover side wall protrusion 305 and the case side wall protrusion 204 in the sliding direction is limited to be a given distance or shorter by the regulation protrusion 205 and the regulation protrusion 306.

The regulation protrusion 205 and the regulation protrusion 306 do not need to be abutted against each other in a state where the cover 30 is attached to the case 20, and as illustrated in FIG. 15(A), a slight gap may be defined therebetween. Also, as illustrated in FIG. 15(A), the regulation protrusion 205 and the regulation protrusion 306 are protruded to neighborhoods of the cover 30 and the case 20, respectively. Therefore, as with the cover side wall protrusion 305 and the case side wall protrusion 204, those regulation protrusions also have an effect of regulating the position of the case 20 in the width direction.

A protruded dimension of the regulation protrusion 205 is set to be smaller than a protruded dimension of the case side wall protrusion 204. As a result, the regulation protrusion 205 is abutted against the cover side wall protrusion 305, and can prevent the slide of the cover 30 from stopping.

In order to suppress abrasion of the protrusions during sliding, it is desirable that at least one of the cover side wall protrusion 305 and the case side wall protrusion 204 has a convex curved surface.

In FIGS. 15(A) and 15(B), the cover side wall protrusion 305 and the case side wall protrusion 204 are each shaped in a semicircular cross-section.

Accordingly, when the cover 30 slides between the attachment start position P1 and the attachment completion position P0, the cover side wall protrusion 305 and the case side wall protrusion 204 move beyond each other while sliding in contact with each other.

It is desirable that an abrasion resistance of the first protrusion 26 is higher than an abrasion resistance of the cover side wall protrusion 305. The reason is described below. Because the first protrusion 26 requires a space in the thickness direction of the housing, the number and position of the first protrusions 26 that can be so arranged as not to interfere with a circuit board inside of the housing are restricted. On the other hand, the cover side wall protrusion 305 is hardly subjected to those limitations, and a plurality of protrusions is easily arranged for abrasion.

As described above, according to the mobile terminal 10 according to the embodiment of the present invention, when a battery pack 11 is housed in the battery compartment 21, and the cover 30 is slid from the attachment start position P1 to the attachment completion position P0 to cover the battery compartment 21, the regulation member 32 disposed on the rear surface 301 of the cover 30 is engaged with the battery pack locking claw 221 of the battery pack holding member 22 that holds the battery pack 11 by locking the upper surface of the battery pack 11. As a result, the movement of the battery pack holding member 22 in a direction of disengaging the battery pack locking claw 221 is regulated so that the battery pack 11 can be surely prevented from coming off from the battery compartment 21.

Also, when the cover 30 slides to the attachment start position P1, the regulation member 32 is also moved and disengaged from the battery pack locking claw 221. As a result, the battery pack locking claw 221 of the battery pack holding member 22 can be moved in the disengaging direction, and the cover 30 is removed so that the battery pack 11 can be easily ejected.

Also, if the engagement of the regulation member 32 and the battery pack locking claw 221 is insufficient, since the cover 30 is not appropriately attached, it can be easily found out that the attachment of the battery pack 11 is insufficient.

Also, since the battery pack holding member 22 is urged against the end surface of the battery pack 11 by the holding member spring 23, when the battery pack 11 is housed, the battery pack holding member 22 is pushed out in the direction of the battery pack 11. As a result, the battery pack 11 can be surely held.

Also, since the down-slope surface toward the upper surface 11A of the battery pack 11 extending from the base end to the tip is disposed on the upper surface 222 of the battery pack locking claw 221, the battery pack locking claw 221 is retreated by pushing the battery pack 11 into the battery compartment 21. For that reason, the battery pack 11 can be easily housed in the battery compartment 21.

Further, since the locking recess 12 is disposed in the end surface 11B of the battery pack 11 at the position corresponding to the battery pack locking claw 221, when the battery pack 11 is removed, the battery pack locking claw 221 is retreated, and the locking recess 12 is caught with the finger so that the battery pack 11 can be ejected.

In the above embodiment, the convex is disposed in the vicinity of the locking recess 12, which is also configured to achieve the same purpose. Also, only the convex may be disposed without provision of the locking recess 12, or only the locking recess 12 may be disposed without provision of the convex. That is, the locking recess does not always need to be recessed when viewed from the other entire surfaces of the battery pack, and has only to be relatively recessed. If the convex is disposed in the vicinity, the locking recess that is caught with the finger relatively exists. Therefore, in the present specification, the provision of only the convex in the vicinity of a portion to be caught with the finger is also regarded as means for providing the locking recess.

Also, in the mobile terminal 10 according to the embodiment of the present invention, when the cover 30 slides to the attachment completion position P0, the engaging protrusion 35 of the cover 30, which is disposed in the center of the case 20 side, is inserted into the engaging hole portion 25 provided in the surface 201 of the case 20. Therefore, the center portion of the cover 30 can be prevented from floating.

Also, the camera lens 41 is arranged so that the top thereof is at a position than the edge rib 241 of the camera recess 24 provided in the surface 201 of the case 20. The abutting parts 36 disposed adjacent to the engaging protrusion 35 of the cover 30 are protruded toward the case 20 more than the tip position of the engaging protrusion 35. For that reason, even if the cover 30 is pushed against the case 20 by some force in sliding the cover 30, the abutting parts 36 is abutted against the edge rib 241 of the camera recess 24, and the engaging protrusion 35 does not reach the camera lens 41. Therefore, the camera lens 41 can be surely prevented from being damaged.

Also, since a pair of the abutting parts 36 are disposed to sandwich the engaging protrusion 35 therebetween, when a force for pushing the cover 30 against the case 20 side is exerted, the abutting parts 36 are abutted against the edge rib 241, and the engaging protrusion 35 can be surely prevented from being abutted against the camera lens 41 to damage the camera lens 41.

Also, the camera recess 24 that houses the camera lens 41 is formed of the edge rib 241 which is a frame rib disposed on the surface 201 of the case 20, and the tip position of the edge rib 241 is protruded toward the cover 30 side more than the end surface of the camera lens 41 on the cover 30 side. Therefore, when the engaging protrusion 35 is brought closer to the camera lens 41, the abutting parts 36 come into contact with the tip surface of the edge rib 241. For that reason, the engaging protrusion 35 can be surely prevented from being abutted against the camera lens 41 to damage the camera lens 41.

Also, sound from the speaker 42 housed in the case 20 is emitted to the external of the housing through the second stop 432 that communicates between the inside and the outside of the cover 30. Therefore, the stop cannot be seen from a front of the outside of the cover 30, thereby causing no disfigurement.

The second stop 432 can be provided without depending on the attaching mode of the cover 30 to the case 20.

Also, since the stop wall 433 forming a substantially cylindrical communication path is disposed between the first stop 431 and the second stop 432 in a state where the cover 30 is attached to the case 20 at the attachment completion position P0, the deterioration of a sound pressure and sound missing can be prevented.

Also, since the bars 435 that go across the stop are disposed on the second stop 432, a strength of the stop portion can be ensured.

Because the second stop 432 is protruded from the cover 30, there is a case in which the finger is inserted into the second stop 432 during removal of the cover 30, and the second stop 432 is damaged by an excessive force. For that reason, the provision of the bars 435 makes it possible that the finger is prevented from entering the back of the second stop 432.

Further, the flashlight 44 that is disposed on the surface 201 of the case 20 and projected from the surface 201 is housed in the light hole 45 disposed in the cover 30 extending from the attachment start position P1 to the attachment completion position P0. The flashlight 44 include the base layer 441, the intermediate layer 442 laminated on the base layer 441, and the light emitting layer 443 laminated on the intermediate layer 442. The base layer 441 is larger in size than the light hole 45. The intermediate layer 442 is shielded with the cover 30 when the cover 30 is located at the attachment start position P1, and exposed when the cover 30 is located at the attachment completion position P0. Also, the light emitting layer 443 is exposed from the light hole 45 when the cover 30 is located at the attachment start position P1 and the attachment completion position P0. For that reason, in a state where the cover 30 is located at the attachment completion position P0, the light emitting layer 443 as well as the intermediate layer 442 is exposed from the light hole 45. Because the intermediate layer 442 is protruded therefrom more than the base layer 441, an uncomfortable feeling of a difference in level between the light emitting layer 443 and the exposed portion can be reduced as compared with a case where the base layer 441 is directly visually recognized.

Also, in the mobile terminal 10 according to the embodiment of the present invention, the cover 30 that covers a given area of the case 20 slides relative to the case 20 from the attachment start position P1 where the cover 30 partially covers the given area to the attachment completion position P0 where the cover 30 entirely covers the given area whereby the cover 30 is attached to the case 20. The first protrusion 26 that can be receded and protruded from the surface 201 through the first protrusion spring 271 is disposed in the case 20. The second protrusion 38, which passes while sinking the first protrusion 26 when the cover 30 slides between the attachment start position P1 and the attachment completion position P0, is disposed on the rear surface 301 of the cover 30.

Accordingly, since the cover 30 repetitively slides, the first protrusion 26 comes into contact with the second protrusion 38, and repetitively vertically moves. However, because the first protrusion 26 vertically moves by the elastic force of the first protrusion spring 271, a sufficient retention force can be maintained for a long period without deterioration of resin.

Also, when the cover 30 is slid from the attachment start position P1 to the attachment completion position P0 for attachment, the first protrusion 26 comes in contact with the second protrusion 38. However, in this situation, since the second protrusion 38 moves along the first attachment slope surface 264 disposed on the first protrusion 26, the first protrusion 26 can be smoothly pressed down.

Also, in removing the cover 30 while sliding from the attachment completion position P0 to the attachment start position P1, the first protrusion 26 comes into contact with the tongue insertion part 28. However, in this situation, since the second protrusion 38 moves along the first removal slope surface 265 disposed on the first protrusion 26, the first protrusion 26 can be smoothly pushed down so that the abrasion of the contact portion can be reduced.

Also, the second attachment slope surface 381 and the second removal slope surface 382 are disposed on the second protrusion 38 that pushes down the first protrusion 26 while relatively sliding along the first attachment slope surface 264 and the first removal slope surface 265 disposed on the first protrusion 26. Therefore, the second protrusion 38 can smoothly pushes down the first protrusion 26 so that the abrasion of the contact portion can be reduced.

Also, in the first protrusion 26 disposed on the cover 30, the inclination angle θ1 of the first attachment slope surface 264 that comes into contact with the second protrusion 38 when attaching the cover 30 is gentler than the inclination angle θ2 of the first removal slope surface 265 that comes into contact with the second protrusion 38 when removing the cover 30. Therefore, the cover 30 can be smoothly attached during attachment, and the cover 30 does not carelessly come off.

Also, when the cover 30 is slid, the tongue part 39 disposed on the rear surface of the cover 30 is inserted into the tongue insertion part 28 disposed in the vicinity of the first protrusion 26 before the first protrusion 26 and the second protrusion 38 come into contact with each other. Therefore, the cover 30 can be prevented from being pushed up by the elastic force of the first protrusion spring 271, which pushes up the first protrusion 26 toward the cover 30 side.

Also, the cover 30 can be slid relative to the case 20 between the attachment start position P1 and the attachment completion position P0 in cooperation between the cover side wall 304 disposed on the cover 30 along the sliding direction relative to the case 20 and the case side wall 203 disposed on the case 20 substantially in parallel to the cover side wall 304. The cover side wall protrusion 305 is disposed on the cover side wall 304, and the case side wall protrusion 204 is disposed on the case side wall 203 to regulate the movement of the cover 30 or the case 20 in the planar direction. For that reason, the cover 30 and the case 20 can be prevented from being displaced from each other even in directions along which the sufficient positional regulation is difficult to conduct by only the first protrusion 26 and the second protrusion 38, such as a direction different from the sliding direction (for example, width direction of the case 20). In the above-mentioned embodiment, the protrusions are disposed on both of the cover side wall 304 and the case side wall 203. Alternatively, the protrusion may be disposed on only any one wall.

Also, the cover side wall protrusion 305 and the case side wall protrusion 204 move beyond each other while sliding in contact with each other during sliding, to thereby enable the positional regulation to be conducted in the sliding direction.

The cover side wall protrusion 305 and the case side wall protrusion 204 may be abraded by sliding contact. Alternatively, the abrasion resistance of the first protrusion 26 mechanically urged toward the case 20 by the first protrusion spring 271 is set to be higher than the abrasion resistances of the cover side wall protrusion 305 and the case side wall protrusion 204 which are made of resin. In this case, even if the cover side wall protrusion 305 and the case side wall protrusion 204, which are made of resin, are abraded, the position in the sliding direction can be regulated by the first protrusion 26 and the second protrusion 38 so that a change in usability can be difficult to feel.

Also, at least one of the cover side wall protrusion 305 and the case side wall protrusion 204 has a convex curved surface. Therefore, as compared with the case using the protrusion having a linear portion, the abrasions of the cover side wall protrusion 305 and the case side wall protrusion 204 can be suppressed during sliding contact.

Further, the case side wall 203 which is at least one of the inner surface of the cover side wall 304 and the case side wall 203 is provided with the regulation protrusion 205 protruded toward the other wall. Therefore, a distance between the cover side wall protrusion 305 and the case side wall protrusion 204 in the sliding direction can be limited to a given distance or shorter. This makes it possible to prevent the displacement in the direction different from the sliding direction from occurring by moving the cover side wall protrusion 305 and the case side wall protrusion 204 away from each other.

Other Modified Examples

The electronic device according to the present invention has been described above with reference to the embodiment. However, the present invention is not limited to the above-mentioned embodiment.

In the above-mentioned embodiment, a pair of the first protrusion 26 and the second protrusion 38 is provided. However, the present invention is not limited to this configuration. Plural pairs may be provided.

Also, in the above-mentioned embodiment, the cover side wall protrusion 305 and the case side wall protrusion 204 move beyond each other while the cover 30 and the case 20 slide. However, the present invention is not limited to this configuration. The cover side wall protrusion 305 and the case side wall protrusion 204 do not move beyond each other, but may be merely abutted against each other. In this case, the effect of regulating the position in the sliding direction is reduced. However, even if those side wall protrusions are not provided, the position in the sliding direction can be regulated by allowing the first protrusion 26 and the second protrusion 38 to contact each other. However, since the first protrusion 26 is so configured as to relatively easily move in the vertical direction, it is desirable to regulate the position by the aid of the side wall protrusion.

Also, in the above-mentioned embodiment, the position in the direction different from the sliding direction is regulated by the cover side wall protrusion 305 and the case side wall protrusion 204. However, the present invention is not limited to this configuration. For example, substantially the same wall as the shape of the second protrusion 38 in the planar direction is disposed in the periphery of the first protrusion 26 so that a movable range of the second protrusion 38 in the direction different from the sliding direction may be regulated.

With the above configuration, the position in the direction different from the sliding direction can be regulated through the second protrusion 38.

Also, in the above-mentioned embodiment, the edge rib 241 surrounds the entire periphery of the camera lens 41. However, the present invention is not limited to this configuration. The edge rib 241 may surround only a part of the camera lens 41. That is, since the edge rib 241 has only to surround only the range that can be abutted against the abutting parts 36 during sliding, the edge rib 241 may not surround the other portions.

Also, in the above-mentioned embodiment, the engaging protrusion 35 is disposed substantially in the center of the cover 30. However, the present invention is not limited to this configuration. The engaging protrusion 35 may be disposed on another portion, or may be disposed on a plurality of portions. However, in order to surely suppress the floating of the cover 30 by a smaller number of protrusions, it is desirable to arrange the engaging protrusion 35 substantially in the center of the cover 30.

Also, in the above-mentioned embodiment, the cover 30 and the case 20 are slid while maintaining the relative positions thereof in the thickness direction. However, the present invention is not limited to this configuration. For example, the relative positions of the cover 30 and the case 20 may be changed during sliding such that the cover 30 and the case 20 are obliquely slid in the thickness direction.

Also, in the above-mentioned embodiment, the bars 435 are disposed for the first stop 431. However, the present invention is not limited to this configuration. No bars may be disposed for the first stop 431. However, when the bars are disposed to cross the second stop 432, sound distortion can be suppressed more if the corresponding bars are also disposed to cross the first stop 431.

Also, the application of the present invention is not limited to the mobile terminal. The present invention may be appropriately applied to other electronic devices.

The electronic device according to the present invention is not limited to the above-mentioned embodiment, but modifications and improvements can be appropriately conducted.

The present invention is based on Japanese Patent Application No. 2010-217661 filed on Sep. 28, 2010, and content thereof is incorporated herein by reference.

REFERENCE SIGNS LIST 10, mobile terminal (electronic device)
11, battery pack
11A, upper surface
11B, end surface
12, locking recess
20, case
21, battery compartment
211, inner surface
22, battery pack holding member
221, battery pack locking claw
222, upper surface (slope surface)
23, holding member elastic member (elastic member)
30, cover
301, rear surface
32, regulation member
P0, attachment completion position
P1, attachment start position

The invention claimed is:

1. An electronic device, comprising:
a case; a recessed battery compartment that is disposed in the case;
a battery pack that is housed in the battery compartment;
a cover that is attached to the case while sliding relative to the case from an attachment start position at which the cover partially covers the battery compartment to an attachment completion position at which the cover entirely covers the battery compartment, for covering the battery compartment;

a battery pack holding member that is disposed on an inner surface of the battery compartment, and has a battery pack locking claw that can be receded and protruded toward an end surface of the battery pack, and locks an upper surface located on a top wall of the battery pack, in which an upper surface of the battery pack locking claw is a down-slope surface toward the upper surface of the battery pack;

an elastic member that always urges the battery pack holding member toward the end surface of the battery pack when the battery pack is housed in the battery compartment, retreats the battery pack holding member away from the battery pack by allowing the end surface of the battery pack to push the down-slope surface when the battery pack is pushing into the battery compartment, and pushing out the battery pack holding member toward the end surface of the battery pack so that the battery pack locking claw locks the upper surface of the batter pack when the battery pack moves to a lower side of the battery pack locking claw; and a regulation member that is disposed on a surface of the cover on the case side, and regulates a movement of the battery pack holding member away from the battery pack by engaging with a rear side of the battery pack locking claw opposed to the down-slope surface when the cover is slid to the attachment completion position, and is disengaged from the battery pack locking claw when the cover is slid to the attachment start position.

2. The electronic device according to claim 1, wherein a locking recess is provided in the end surface of the battery pack at a position corresponding to the battery pack locking claw, and used when the battery pack is ejected from the battery compartment.

* * * * *